Aug. 12, 1947.                M. A. EDWARDS ET AL                2,425,607
                   CONTROL SYSTEM FOR AIRCRAFT TURBOSUPERCHARGERS
                                Filed June 5, 1943
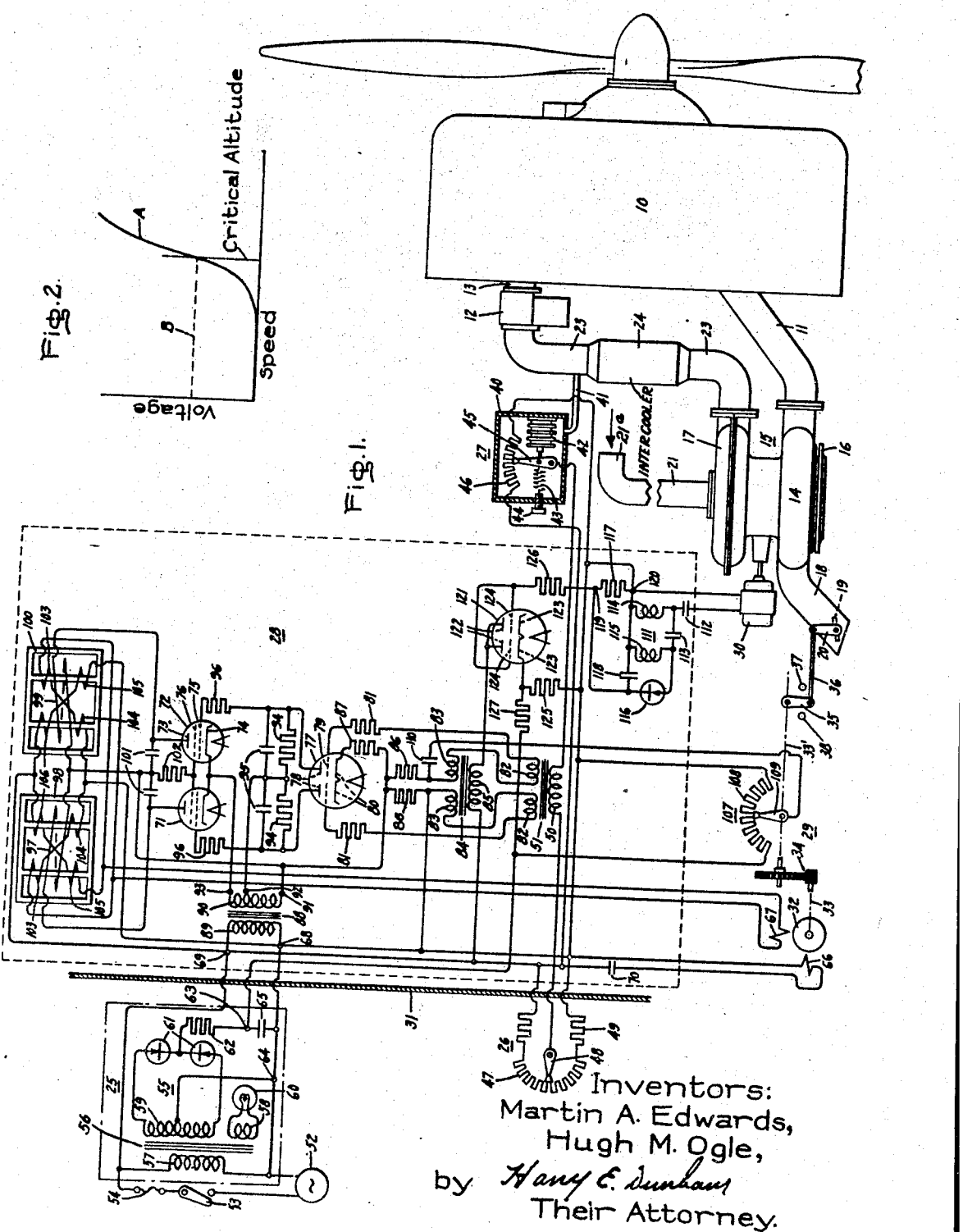
Inventors:
Martin A. Edwards,
Hugh M. Ogle,
by Harry E. Dunham
Their Attorney.

Patented Aug. 12, 1947

2,425,607

UNITED STATES PATENT OFFICE 2,425,607

CONTROL SYSTEM FOR AIRCRAFT TURBOSUPERCHARGERS

Martin A. Edwards, Scotia, and Hugh M. Ogle, Schenectady, N. Y., assignors to General Electric Company, a corporation of New York Application June 5, 1943, Serial No. 489,798

8 Claims. (Cl. 230—11)

1

Our invention relates to a control system for aircraft turbosuperchargers and especially to control system for turbosuperchargers wherein the turbosupercharger is operated by exhaust gases from an aircraft internal combustion engine and the air compressed by the turbosupercharger is used to supercharge the engine.

It is an object of our invention to provide a new and improved control system for turbosuperchargers for aircraft.

It is another object of our invention to provide new and improved regulating means for turbosuperchargers which maintain constant a predetermined pressure appurtenant to the operation of the supercharger such, for example, as compressor discharge or carburetor inlet pressure, and furthermore to maintain this pressure over a predetermined range of operation with great stability.

It is another object of our invention to provide new and improved means for regulating a turbosupercharger in which the only connections between those component parts of the regulating means which are widely separated are electrical and all long fluid and mechanical connections are dispensed with.

Still another object of our invention is to provide new and improved means for regulating a turbosupercharger in which constant carburetor pressure is maintained over a predetermined range of operation and beyond this range of operation the speed of the supercharger is prevented from exceeding a predetermined maximum speed.

Further objects and advantages of our invention will become apparent as the following description proceeds and the features of novelty which characterize our invention will be pointed out with particularity in the claims annexed to and forming a part of this specification.

For a better understanding of our invention reference may be had to the accompanying drawing in which Fig. 1 is a diagrammatic view of a turbosupercharger control system embodying our invention, and Fig. 2 is a curve diagram to aid in understanding our invention.

Referring now to the drawing, 10 indicates an aircraft internal combustion engine having an intake manifold not shown and an exhaust manifold, only a portion of which is shown at 11. A carburetor 12 is schematically indicated as having its outlet connected to the intake manifold (not shown) as by means of a conduit 13. Exhaust manifold 11 is connected either directly or through a suitable conduit to the nozzle box 14 of an exhaust gas-driven supercharger generally

2 indicated at 15. The turbine wheel of the supercharger 15 is indicated at 16 and the compressor at 17. Connected with the nozzle box 14 is a waste gate conduit 18 in which is located an adjustable waste gate or waste valve 19 used in regulating the turbosupercharger. On the shaft of the waste gate 19 is fixed an arm or crank 20 for use in positioning the gate or valve means 19.

Connected to the inlet of compressor 17 is an intake conduit 21 for conveying air from the slip stream of the aircraft to the compressor. To this end conduit 21 is connected with a suitable ram 21a which faces into the slip stream of the air craft. The discharge side of compressor 17 is connected by a conduit 23 to the intake of carburetor 12. If desired a suitable intercooler such as is indicated at 24 may be provided in conduit 23 to maintain the temperature of the air entering carburetor 12 within a predetermined range for best airplane performance.

The arrangement so far described is a known one and is to be taken as typical of any turbosupercharger installation. In operation exhaust gases from the air craft engine are supplied through exhaust manifold 11 and a suitable conduit, if this is necessary, to the nozzle box 14, from which they are discharged through a ring of nozzles to the turbine wheel 16 of supercharger 15 or through waste conduit 18 directly to atmosphere. When waste gate 19 is wide open substantially all the exhaust gases discharge directly to atmosphere, little if any passing through the nozzles to the turbine wheel 16. This represents no load on the supercharger. As waste gate 19 is gradually closed, pressure is built up in nozzle box 14 effecting a gradually increasing flow of exhaust gases through the nozzles to the turbine wheel to operate the supercharger. The maximum load on the supercharger is reached when waste gate 19 is fully closed so that all gases from the engine are discharged against the turbine wheel 16. Ordinarily waste gate 19 is in an intermediate position, part of the exhaust gases being discharged to atmosphere and the remainder passing through the turbine wheel 16.

Our invention has to do particularly with improved means for regulating waste gate 19, and consists essentially of six elements the connections between which are solely electrical. These elements comprise a control box generally indicated at 25, a manual pressure-setting means generally indicated at 26, a pressure unit generally indicated at 27, an amplifier generally indicated at 28, a waste gate drive unit generally indicated at 29 and a tachometer generator 30.

The control box and manual pressure setting means may be mounted within the cabin 31 of the aircraft if desired although only the manual pressure setting means necessarily should be in the cabin 31. The pressure unit 27 is mounted closely adjacent to the point at which pressure corresponding to the pressure to be regulated is obtained, while similarly the waste gate drive unit 29 is mounted closely adjacent to the waste gate 19 and also tachometer generator 30 driven from supercharger 15 is mounted closely adjacent to turbosupercharger 15, thereby permitting that fluid, mechanical, or connections other than electrical connections may be maintained at an absolute minimum.

The position of waste gate 19 may be varied by any suitable means such, for example, as a hydraulic piston or the like. However, due to the very low temperatures encountered by high flying air craft, the oil used to operate a piston or similar device is likely to congeal and unsatisfactory operation results. Preferably, therefore, we have illustrated the waste gate drive unit 29 as comprising a two-phase or quarter-phase alternating current motor 32 which is mechanically connected so that upon rotation thereof movement of the arm or crank 20 occurs. The mechanical connections between motor 32 and arm 20 comprise a shaft 33, suitable gearing 34, shaft 33', crank 35 and link 36. Link 36 interconnects the ends of cranks 20 and 35. The extreme positions of waste gate 19 are determined by suitable stop means 37 and 38 respectively.

The operation of motor 32 and consequently the position of waste gate 19 may be controlled, as will be obvious from the following description, in response to any pressure appurtenant to an operating condition of the supercharger 15 such, for example, as the compressor discharge or carburetor inlet pressure. It has been found desirable to maintain this pressure constant for normal operation of the aircraft. This means that as the air craft rises the speed of the supercharger must increase to maintain this pressure constant. When a predetermined critical speed is reached, it is not feasible to permit further increase in speed of the supercharger to maintain constant the pressure being regulated. Furthermore, it has been found desirable to regulate the speed of the supercharger and maintain it constant at the critical speed for altitudes above the so-called "critical altitude" which is the altitude at which the maximum supercharger speed to maintain constant a predetermined pressure is obtained. It is desirable to control motor 32 which positions waste gate 19 so as to maintain constant a predetermined pressure appurtenant to an operating condition of the air craft engine 10 or supercharger 15, up to a certain critical speed, and thereafter to maintain constant this critical speed.

As will become apparent from the following description, quarter-phase motor 32 is controlled by an electronic amplifier 28 which receives a controlling signal from pressure unit 27. Pressure unit 27 comprises a sealed casing 40 which is connected by means of a conduit 41 to conduit 23 if compressor discharge or carburetor inlet pressure is to be regulated. If some other pressure is to be regulated, it will be obvious that conduit 41 will be connected to some part of the supercharger circuit of the air craft 10. Mounted within sealed box 40 is a pressure responsive means 42 which has been illustrated as a flexible bellows. The exterior of bellows 42 is subjected to the pressure within sealed box 40 while the interior of bellows 42 is evacuated so that movement of bellows 42 will be in response to absolute carburetor inlet or compressor discharge pressure. With this arrangement only a single bellows is required to regulate a predetermined absolute pressure appurtenant to an operating condition of supercharger 15.

The movement of evacuated bellows 42 is opposed by tension spring 43. The tension of spring 43 may be suitably adjusted by adjustable screw 44. Also mounted within sealed box or casing 40 is a potentiometer comprising a movable arm 45 which is connected to bellows 42 so as to be moved thereby in response to expansion and contraction of bellows 42. The potentiometer mounted within sealed box 40 also comprises a resistance 46 across which one end of arm 45 is adapted to move and continuously engage therewith. The terminals of resistance 46 are connected to the terminals of a resistance 47 which forms part of the potentiometer comprising manual pressure setting means 26. An arm 48 similar to arm 45 completes the potentiometer of manual pressure setting means 26. Suitable calibrating resistances 49 are provided in the electrical connections between the terminals of resistance 47 and 46. Arms 45 and 48 are electrically interconnected through the primary winding 50 of a first input transformer 51. The manual pressure setting means 26 which is preferably mounted in the cabin 31 of the air craft is adjusted by the pilot or operator to maintain a predetermined pressure which through means to be described hereinafter causes the arm 45 of control box 27 to assume a corresponding position thereby to maintain a constant pressure in sealed box 40 until the critical altitude of the air craft is reached. Whenever a change in the pressure being regulated occurs, arm 45 will assume a position different from that of arm 48. Also arms 45 and 48 will have different corresponding positions if the pressure called for by manual pressure setting means 26 differs from the actual pressure in sealed box 40.

The power for energizing the potentiometer circuit comprising the potentiometers in manual pressure setting means 26 and pressure unit 27 is obtained from control box 25 which is connected to any suitable source of alternating current generally indicated at 52. As a general rule, the source of alternating current on modern aircraft is 400 cycle alternating current and our invention is adapted to be supplied from a source of such alternating current. This source of alternating current illustrated schematically at 52 is connected across the terminals of resistances 46 and 47 of the associated potentiometers through a suitable manual switch 53 and a protective fuse 54. With this arrangement of the potentiometer circuit, no alternating current voltage will appear across the primary winding 50 of amplifier input transformer 51 unless the arms 45 and 48 of the potentiometers including resistances 46 and 47 respectively are not positioned identically with respect to these resistances. The voltage across primary winding 50 of input transformer 51 will be either in phase or 180 degrees out of phase with respect to the supply potential 52, thereby controlling amplifier 28 which is polarity responsive.

Since, as will become apparent from the following description, a direct current is required for certain purposes in connection with our regulating means, control box 25 includes a biphase rectifier generally indicated at 55. A suitable rectifier input transformer 56 is provided which has a primary winding 57 connected across the source of alternating potential 52. Transformer 56 is provided with two secondary windings 58 and 59 respectively. Secondary winding 58 is connected to energize an indicating means 60 whenever switch 53 is closed. Winding 59, on the other hand, has its end terminals respectively connected to the anodes of a pair of electric discharge valves 61, which are arranged in the usual manner in the biphase rectifier 55. The cathodes of valve 61 are connected through a resistance 62 to a terminal 63 which forms the positive terminal of the output of rectifier 55. The negative terminal 64 of biphase rectifier 55 is connected to the midpoint of secondary winding 59. A suitable capacitor 65 connected between terminals 63 and 64, together with resistor 62, provides a suitable filter for reducing the alternating current ripple across the direct current output.

The motor 32 of waste gate drive 29 is an alternating current motor so as to be free of the difficulties often encountered with the commutators of direct current motors in high flying aircraft and furthermore is constructed so as not to require slip rings. The quarter phase windings are represented respectively by the reference numerals 66 and 67. The phase winding 66 is energized directly across the terminals 68 and 69 of alternating current source 52 through a suitable phase shifting capacitor 70. Winding 66 is energized whenever switch 53 is closed. Winding 67, on the other hand, is energized from the output of amplifier 28 in dependence upon the control voltage appearing across the primary windings of the amplifier input transformers. Winding 67 will be energized with an alternating potential which may change in phase by 180 degrees depending upon the polarity of the signal appearing across winding 50 of transformer 51. Motor 32 will rotate in a direction depending upon the polarity of this signal voltage to position waste gate 19 in response to the operation of pressure unit 27. Capacitor 70 is adjusted so that the phase of the currents energizing windings 66 and 67 are displaced by substantially 90 degrees. For one direction of rotation the potential across winding 67 will lead the potential across winding 66 by substantially 90 degrees, and for the other direction of rotation will lag by substantially 90 degrees.

The amplifier 28 is a two-stage electronic amplifier containing balanced circuits so arranged that it is polarity sensitive and in some respects is quite similar to the arrangement disclosed and claimed in copending application Serial No. 361,599, Edwards, filed October 17, 1940, and assigned to the same assignee as the present application. Amplifier 28 comprises a pair of electric discharge devices 71 and 72 respectively, each provided with an anode 73, a cathode 74, a control electrode 75, and a screen grid 76. Amplifier 28 also includes an electric discharge valve 77 which is essentially two valves in a single envelope often referred to as a twin, or duplex triode. This electric discharge valve comprises a pair of anodes 78, a pair of control electrodes 79, and a pair of cathodes 80. Each of the grid-to-cathode circuits of grids or control electrodes 79 includes a current limiting resistor 81, a secondary winding 82 of a first input transformer 51, a secondary winding 83 of a second input transformer 84 which has a single primary winding 85, and a resistor 86 across which the transient stabilizing voltage to be described hereinafter is impressed. A single plate current limiting resistor 87 is connected to the cathodes 80 and is common to both of the plate and both of the grid circuits of twin electric discharge valve 77.

The plate circuits of twin electric discharge valve 77 are energized from an alternating current plate supply voltage obtained from the secondary winding of transformer 88. The primary winding 89 of transformer 88 is connected directly across the terminals 68 and 69 of alternating current power source 52. The secondary winding 90 comprises three terminals 91, 92 and 93 respectively. The major portion of the secondary winding is between terminals 91 and 92 which are connected to supply the plate or anode cathode circuits of twin electric discharge valve 77. Each of these plate circuits connected across terminals 91 and 92 of supply transformer 88 includes the common plate current limiting resistor 87 and a resistor 94 for each plate circuit, one of which is connected in series with each of the anodes 78 of twin discharge valve 77. With zero voltage appearing on input transformers 51 and 84 respectively, the two portions of twin discharge valve 77 carry equal currents. Furthermore, since twin discharge valve 77 acts as a rectifier, it applies half-wave power to each of the resistors 94 in the anode circuits thereof. A pair of capacitors 95 one for each resistor 94 are connected across the respective resistor so as to act as a smoothing capacitor to smooth out the ripples and also provide the circuits with a "memory action" for the next half cycle to average out the half wave power over the entire cycle.

The resistors 94 in the plate circuits of twin discharge valve 77 are connected in the grid-to-cathode circuits of the respective electric discharge valves 71 and 72 in such a manner as to normally provide a negative biasing potential on the control electrode 75 of each of the electric discharge valves 71 and 72. An alternating current potential in phase with the main power supply is also impressed on the grid-to-cathode circuits of each of the electric discharge valves 71 and 72 by connecting the portion between terminals 92 and 93 of the secondary winding 90 of transformers 88 in series with the grid-to-cathode circuits of electric discharge valves 71 and 72. Each of these grid-to-cathode circuits is also provided with a current limiting resistor 96. The plate or anode-cathode circuit of electric discharge valve 71 includes the portion of secondary winding 90 between terminals 91 and 93 of input transformer 88 and the direct current saturating winding 97 of a saturable reactor 98 to be described hereinafter. Similarly, the plate or anode-cathode circuit of electric discharge valve 72 includes the portion of secondary winding 90 between terminals 91 and 93 of input transformer 88 and the direct current saturating winding 99 of the saturable reactor 100. Suitable capacitors 101 are connected across the saturating windings 97 and 99 respectively, which windings form the load connected to electric discharge valves 71 and 72, so as to neutralize some of the inductance thereby facilitating the initiation of current flow therethrough. The screen grids 75 of electric discharge valves 71 and 72 are connected through a suitable screen grid dropping resistor 102 to the common terminal of saturating windings 97 and 99.

Electric discharge valves 71 and 72 also carry equal anode currents in the same manner as the currents flowing in the twin triode 77 when the voltages across the primary windings of transformers 51 and 84 respectively are zero. When an alternating current voltage in phase with the power supply is impressed across secondary windings 82 of input transformer 51, an unbalance occurs in the currents flowing through discharge valves 71 and 72 for example, electric discharge valve 71 may carry more current while electric discharge valve 72 may carry less. If, however, the input voltage is 180 degrees out of phase with the plate voltage obtained from transformer 88, the unbalance will be reversed and electric discharge valve 72 will now carry more current than electric discharge valve 71.

Saturable reactors 98 and 99 are each provided with alternating current windings 103, 104, 105 and 106 respectively. These windings are arranged in the form of a bridge, two corners of which are connected across terminals 68 and 69 of the alternating current source of power 52. The opposite corners of the bridge are connected across phase winding 67 of waste gate driving motor 32. Under normal operating conditions when balanced currents flow in electric discharge valves 71 and 72, relatively small balanced currents flow in the saturating windings 97 and 99 of saturable reactors 98 and 100 respectively. It is desired, in order to save power, to maintain the direct current flowing in the saturating windings as low as possible which is controlled by properly adjusting the magnitude of resistor 87 connected in the plate circuits of twin triode 77. As long as balanced currents flow in the amplifier, no current will flow in phase winding 67 of motor 32. Whenever the currents in amplifier 28 are unbalanced by virtue of an amplifier input voltage, in phase with the power supply voltage, one of the reactors 97 becomes saturated more than the other and an alternating voltage either in phase or 180 degrees out of phase with respect to the plate supply voltage of two stage amplifier 28 is impressed across phase winding 67 of motor 32. Depending upon the polarity of this voltage with reference to the voltage of source 52, motor 32 will rotate in one direction or the other to open or close waste gate 19. By means of the saturable reactors 98 and 100, a relatively high power output can be obtained to drive motor 32 in response to a small input voltage.

To stabilize the operation of the regulating means embodying our invention we provide an anti-hunting means which is responsive directly to rate of change of waste gate position. To this end we provide a potentiometer 107 including a resistor 108 the terminals of which are connected to the direct current supply terminals 63 and 64 of biphase rectifier 55. The movable arm 109 of the stabilizing potentiometer is mounted on shaft 33' so as to be controlled by the movement of waste gate 19. The output terminals of stabilizing potentiometer 107 are connected across resistors 86 of the grid circuits of twin triode 77. These resistors are connected in series with each other so that a potential will appear across each resistor in dependence upon the current caused to flow therethrough by virtue of the output potential of stabilizing potentiometer 107. In order to prevent hunting of the regulator it is desired to introduce a stabilizing potential across resistors 86 which is proportional only to the rate of change of waste gate position. Accordingly, we insert a capacitor 110 in the output circuit of potentiometer 107 so that no potential is introduced across resistors 86 except a transient voltage produced when waste gate 19 is changing position which voltage is responsive to rate of change of waste gate position. With this arrangement the stabilizing means operates without any droop (recalibration of the regulating means with change in position of waste gate 19) in the pressure regulating means and the transient voltage drops across resistors 86 control amplifier 28 so as to eliminate any hunting in the regulator for maintaining constant the compressor discharge pressure.

As was mentioned above, after the aircraft attains the critical altitude which may be in the neighborhood of 25,000 feet, the speed of the supercharger 15 has increased to a value above which it is not feasible to operate it for any long periods of time, and consequently it is desirable to provide means for preventing this speed from exceeding the so-called critical speed. At altitudes above that corresponding to the critical speed of the supercharger, therefore, we provide regulating means to hold the speed of the supercharger constant. In order to obtain a quantity proportional to the speed of the supercharger, we have provided an alternating current or tachometer generator 30 which may be driven directly from the supercharger 15 as indicated in the drawing. The output of this generator is connected through a high pass filter 111 comprising a plurality of capacitors 112 and 113 and a plurality of inductances 114 and 115. The output of high pass filter 111 is connected through a rectifier 116 across a resistance load 117. A suitable smoothing capacitor 118 is provided so that a fairly uniform direct current potential appears across the terminals 119 and 120 of resistor 117, 119 being the positive terminal and 120 being the negative terminal. High pass filter 111 has a characteristic so that at low frequencies and consequently at low speeds of alternating current generator 30, substantially no voltage appears across resistance 117. The curve A of Fig. 2 represents the characteristic of high pass filter 111 by illustrating the voltage appearing across resistor 117 as the speed of the supercharger and consequently the speed of tachometer generator 30 increases. It will be observed that at the critical altitude the output of filter 111 increases very rapidly whereas below the critical altitude this output is substantially negligible.

In order to utilize the voltage across resistor 117 to prevent supercharger 15 from exceeding a predetermined maximum speed, we provide an electric discharge valve 121 which may be any form of electric discharge valve well known to those skilled in the art. We have chosen to illustrate electric discharge valve 121 as a twin triode type of valve with anodes 122, cathodes 123 and control electrodes of grids 124. Electric discharge valve 121 might equally well be a valve having but a single cathode, a single anode and a single control electrode, since we operate electric discharge valve 121 with the anodes in parallel with one another as are also the control electrodes so as to carry a larger amount of current. The plate or anode-cathode circuit of electric discharge valve 121 is connected through the primary winding 85 of amplifier input transformer 84 and a resistor 125 to the terminals 68 and 69 of alternating potential source 52. The grid-to-cathode circuit of electric discharge valve 121, on the other hand, is completed through current limiting resistor 126, resistor 117 and resistor 125. Resistor 125 is a biasing resistor and is connected across the terminals 63 and 64 of biphase rectifier 55 through resistor 127. Resistors 125 and 127 are so adjusted that a predetermined direct current potential appears across resistor 125 to bias the control electrodes 124 negative so that a positive voltage corresponding to the curve B of Fig. 2 is required across resistor 117 before electric discharge valve 121 can be rendered conductive. In other words, as is obvious from Fig. 2, electric discharge valve 121 will become conducting at the critical altitude of the aircraft 10 and will produce an output voltage across primary winding 85 of amplifier input transformer 87 of half-wave power which will bear a predetermined phase relationship to the alternating current potential of source 52, the phase relationship being either in phase, or 180 degrees out-of-phase, depending upon the particular connections of winding 67 of waste gate motor 32. In any event the phase relationship of the voltage impressed on primary winding 85 of transformer 84 will be such as to cause waste gate motor phase winding 67 to be energized with a polarity to cause opening of waste gate 19. In other words, whenever electric discharge valve 121 becomes conducting, motor 32 will be energized to open waste gate 19. Furthermore, the ratios of transformation of input transformers 51 and 84 are such that a voltage appearing across primary winding 85 of transformer 84 will take control over a voltage appearing across primary winding 50 of transformer 51.

It will be obvious that the follow-up mechanism or anti-hunting means used for stability operation and described in connection with the pressure regulating means above operates in exactly the same manner on the overspeed control as it does with regard to regulating pressure.

The operation of the turbosupercharger regulator described will be fairly obvious from the detailed description included above. Assume that the aircraft is in the air and is flying at an altitude lower than the critical altitude of the supercharger, that is, at an altitude below the maximum for which the supercharger is capable of maintaining without excess speed a predetermined pressure at the discharge side of the compressor, for example, sea level pressure. Assume also that at such altitude, waste gate 19 is in a partially closed position as indicated in the drawing, and the supercharger is operating at a speed such that the desired pressure obtains on the discharge side of compressor 17 of supercharger 15. With this arrangement, potentiometer arm 45 of pressure unit 27 will be positioned in response to absolute compressor discharge pressure for operation of bellows 42. If, now, for some reason, the pressure on the discharge side of compressor 17 decreases, the pressure within sealed box 40 will decrease and bellows 42 will expand so that spring 43 will move regulating arm 45 across resistor 46 toward the left with reference to Fig. 1. This in turn will cause a voltage of a predetermined phase relationship with respect to alternating source of potential 52 to be impressed across primary winding 50 of input transformer 51 thereby unbalancing the currents flowing in amplifier 28 and causing phase winding 67 of motor 32 to be energized in such a manner as to move waste gate 19 toward the closed position, thereby causing more of the exhaust gases from aircraft engine 10 to pass through the nozzles of turbine wheel 16 with consequent increase in speed of supercharger 15. Such increase in speed will tend to increase the discharge pressure of compressor 17. Movement of waste gate 19 to the closed position will also cause arm 109 of stabilizing potentiometer 107 to move to the left as viewed in Fig. 1 and introduce a transient stabilizing voltage across resistors 86 so as to cause deenergization of phase winding 67 of motor 32 before waste gate 19 has closed too far. By properly adjusting the regulator, the pressure in sealed box 40 will increase rapidly at first and then slow down just before it reaches the value called for stopping at this value with no overshooting or undershooting.

When the critical altitude is reached, that is the altitude at which maximum desired speed of supercharger 15 is obtained, the output of generator 30 and high pass filter 111 is such that the voltage across resistor 117 will overcome the voltage across bias resistor 125 and cause electric discharge valve 121 to become conducting, which causes a voltage to be impressed across primary winding 85 of amplifier input transformer 84 of such a phase position relative to the phase of alternating source 52 as to energize winding 67 of motor 32 to cause opening of waste gate 19. If the speed of supercharger 15 is reduced too far, the pressure regulating means including pressure unit 27 will again take control and maintain constant pressure up to the critical altitude.

With the invention described above it is possible to obtain close automatic and stable operation of the turbosupercharger with improved apparatus which is very simple in construction and reliable in operation. Furthermore, all connections of the fluid or mechanical nature are very short and the only connection between parts of the apparatus which are of any length whatever are electrical.

While we have shown and described a particular embodiment of our invention, it will be apparent to those skilled in the art that our invention is not limited to the particular embodiment shown, but that changes and modifications may be made without departing from the spirit and scope of our invention, and we aim in the appended claims to cover all such changes and modifications.

What we claim as new and desire to secure by Letters Patent of the United States is:

1. In combination, a turbosupercharger actuated by exhaust gases, valve means for regulating the flow of exhaust gases to the turbine, a motor for controlling said valve means, and means responsive to a predetermined pressure appurtenant to an operating condition of said supercharger for positioning said valve means to maintain said predetermined pressure at a substantially constant value over a predetermined range of operation comprising a plurality of units interconnected solely by electrical leads including a manual pressure setting means, a pressure unit mounted adjacent said pressure to be regulated, and an amplifier responsive to changes in the pressure to be regulated for amplifying said pressure changes arranged to control said motor.

2. In combination, a turbosupercharger actuated by exhaust gases, a waste gate for regulating the flow of exhaust gases to the turbine, a polyphase alternating current motor for positioning said waste gate, a source of alternating current, means for continuously energizing one phase winding of said motor from said source of alternating current, an electronic amplifier including a saturable reactor for energizing another phase winding of said motor with an alternating current which either leads or lags said alternating current of said source to cause rotation of said motor either in one direction or the other, and means responsive to a predetermined pressure appurtenant to an operating condition of said supercharger for controlling said amplifier to cause said motor to position said waste gate so as to maintain said pressure at a substantially constant value over a predetermined range of operation.

3. In combination, a turbosupercharger actuated by exhaust gases, a waste gate for regulating the flow of exhaust gases to the turbine, a polyphase alternating current motor for positioning said waste gate, a source of alternating current, means for continuously energizing one phase winding of said motor from said source of alternating current, an electronic amplifier for energizing another phase winding of said motor with an alternating current which either leads or lags said alternating current of said source to cause rotation of said motor either in one direction or the other, means responsive to a predetermined pressure appurtenant to an operating condition of said supercharger for controlling said amplifier to cause said motor to position said waste gate and maintain said pressure at a substantially constant value over a predetermined range of operation, and speed responsive means driven by said supercharger for controlling said amplifier and consequently said motor for positioning said waste gate at speeds of said supercharger above the highest speed within said range of operation.

4. In combination, a turbosupercharger actuated by exhaust gases, a waste gate for regulating the flow of exhaust gases to the turbine, a polyphase alternating current motor for positioning said waste gate, a source of alternating current, means for continuously energizing one phase winding of said motor from said source of alternating current, an electronic amplifier for energizing another phase winding of said motor with an alternating current which either leads or lags said alternating current of said source to cause rotation of said motor either in one direction or the other, means responsive to a predetermined pressure appurtenant to an operating condition of said supercharger for controlling said amplifier to cause said motor to position said waste gate and maintain said pressure at a substantially constant value over a predetermined range of operation, and speed responsive means including a high pass filter and an alternating current generator driven by said supercharger for controlling said amplifier and consequently said motor for positioning said waste gate at speeds of said supercharger above the highest speed within said range of operation.

5. In combination, a turbosupercharger actuated by exhaust gases, a waste gate for regulating the flow of exhaust gases to the turbine, an electric motor for positioning said waste gate, means for controlling the energization of said motor to position said waste gate and maintain constant a predetermined pressure appurtenant to an operating condition of said supercharger including an electronic amplifier responsive to changes in said predetermined pressure for amplifying said changes in said predetermined pressure for controlling said motor, and means responsive to speeds above a predetermined maximum speed of said supercharger for taking over control of said amplifier and preventing said maximum speed from being exceeded.

6. In combination, a turbosupercharger actuated by exhaust gases, valve means for regulating the flow of exhaust gases to the turbine, an electric motor for positioning said valve means, means including an electronic amplifier responsive to a predetermined pressure appurtenant to an operating condition of said supercharger for energizing said motor to position said valve means to maintain said predetermined pressure at a substantially constant value over a predetermined range of operation, means for controlling said amplifier in response to supercharger speed outside said range of operation to prevent said supercharger from exceeding a predetermined speed comprising means responsive to the speed of said supercharger, and a high pass filter connected between said last mentioned means and said amplifier for preventing said last mentioned means from becoming effective until said predetermined speed has been attained.

7. In combination, a turbosupercharger actuated by exhaust gases, a waste gate for regulating the flow of exhaust gases to the turbine, an electric motor for positioning said waste gate, means for controlling the energization of said motor to position said waste gate and maintain constant a predetermined pressure appurtenant to an operating condition of said supercharger including an electronic amplifier responsive to changes in said predetermined pressure, means responsive to speeds above a predetermined maximum speed of said supercharger for taking over control of said amplifier and preventing said maximum speed from being exceeded, and stabilizing means responsive to rate of change of waste gate position to insure that said waste gate is positioned without over or under shooting the correct position.

8. In combination, a turbosupercharger actuated by exhaust gases, a waste gate for regulating the flow of exhaust gases to the turbine, a polyphase alternating current motor for positioning said waste gate, a source of alternating current, means for continuously energizing one phase winding of said motor from said source of alternating current, an electronic amplifier for energizing another phase winding of said motor with an alternating current which either leads or lags said alternating current of said source to cause rotation of said motor either in one direction or the other, means responsive to a predetermined pressure appurtenant to an operating condition of said supercharger for controlling said amplifier to cause said motor to position said waste gate so as to maintain said pressure at a substantially constant value over a predetermined range of operation, and stabilizing means responsive to rate of change of waste gate position to insure that said waste gate is positioned without over or under shooting the correct position.

MARTIN A. EDWARDS.
HUGH M. OGLE.

REFERENCES CITED

The following references are of record in the file of this patent:

UNITED STATES PATENTS

| Number | Name | Date |
| --- | --- | --- |
| 2,283,175 | Berger | May 19, 1942 |
| 1,557,793 | Berger et al. | Oct. 20, 1925 |
| 1,586,233 | Anschutz-Kaempfe | May 25, 1926 |
| 1,508,731 | Standerwick | Sept. 16, 1924 |
| 2,376,142 | Hoffman et al. | May 15, 1945 |
| 2,388,350 | Taylor | Nov. 6, 1945 |

Disclaimer 2,425,607.—*Martin A. Edwards*, Scotia, and *Hugh M. Ogle*, Schenectady, N. Y. CONTROL SYSTEM FOR AIRCRAFT TURBOSUPERCHARGERS. Patent dated Aug. 12, 1947. Disclaimer filed Dec. 8, 1948, by the assignee, *General Electric Company*.

Hereby enters this disclaimer to claims 1, 2, 3, and 5 of said patent.

[*Official Gazette January 11, 1949.*]